United States Patent [19]

Civardi

[11] 4,448,831
[45] * May 15, 1984

[54] LEATHERLIKE FABRICS

[75] Inventor: Frank P. Civardi, Wayne, N.J.

[73] Assignee: Milliken Research Corporation, Spartanburg, S.C.

[*] Notice: The portion of the term of this patent subsequent to Oct. 26, 1993 has been disclaimed.

[21] Appl. No.: 843,322

[22] Filed: Oct. 18, 1977

Related U.S. Application Data

[63] Continuation of Ser. No. 711,589, Aug. 4, 1976, Pat. No. 4,055,693, which is a continuation of Ser. No. 542,993, Jan. 22, 1977, Pat. No. 3,988,488.

[51] Int. Cl.³ .............................................. B32B 27/40
[52] U.S. Cl. ..................................... 428/91; 427/331; 427/368; 427/371; 427/379; 427/412; 427/393.5; 428/95; 428/96; 428/97; 428/155; 428/904

[58] Field of Search ....................... 428/91, 95, 96, 97, 428/904, 155; 156/306; 427/331, 368, 371, 379, 385 B, 412

[56] References Cited

U.S. PATENT DOCUMENTS 4,017,656  4/1977  Lasman ................................. 428/86

Primary Examiner—Marion McCamish
Attorney, Agent, or Firm—Earle R. Marden; H. William Petry

[57] ABSTRACT

A napped fabric is treated to bond the nap fibers together while leaving the nap structure largely open and porous. The surface of the bonded nap is then subjected to a series of spaced short cuts to form spaced clumps of bonded fibers which clumps have free ends projecting from the bonded nap so that they can be brushed from stable upright positions to bent-over positions, giving an attractive rough appearance resembling a split suede leather.

43 Claims, 13 Drawing Figures

|← 5mm →|  FIG. 1

|← 0.5mm →|
|← 0.005 inch →|

|←— 1 mm —→|

|←—5mm—→|

LEATHERLIKE FABRICS

This is a continuation of application Ser. No. 711,589 filed Aug. 4, 1976, U.S. Pat. No. 4,055,693 which is a continuation of Ser. No. 542,993, filed Jan. 22, 1977, U.S. Pat. No. 3,988,488.

This application incorporates by reference the entire disclosure of Civardi et al application Ser. No. 474,406 filed May 30, 1974 and its parent application of Civardi et al Ser. No. 398,696 filed Sept. 19, 1973.

The material incorporated by reference is included in U.S. Pat. No. 4,122,223 issued Oct. 24, 1978 (specifically at column 1 line 9 to column 8 line 6 and column 8 line 41 to column 19 line 44 of 4,122,223).

This application relates to the production of sheet materials having a desirable rough appearance like that of split suede leather, starting with a textile fabric backing comprising interlaced multifiber yarns. One face of the fabric is napped and the napped fibers are bonded together, as by impregnation thereof with a polymeric bonding agent in amount such that the nap structure is still largely open and porous, as described for instance in the above-mentioned copending patent applications Ser. No. 474,406 and 398,656. The surface of the bonded nap is then subjected to a series of spaced short cuts to form spaced clumps of bonded fibers which clumps have free ends projecting from the bonded nap so that they can be brushed from stable upright positions to bent-over positions, giving an attractive rough appearance resembling a split suede leather.

In the accompanying drawings,

FIGS. 9 and 10 are photomicrographs (taken like FIG. 6) of the nap-impregnated face of the product after sanding as described below: FIG. 9 shows the clumps or tufts brushed up, in raised position, while FIG. 10 shows them brushed down.

FIG. 11 is a S.E.M. photomicrograph of the nap-impregnated face of the sanded product.

In one preferred embodiment the cutting to form the clumps is effected by means of a rotating "sanding" drum located so that only the tips of its randomly spaced projecting abrasive grains penetrate into the compressible bonded nap while the latter is being moved past the drum (generally at a considerably slower linear speed than the linear speed of the abrasive surface of the drum) in a direction co-current with that of said abrasive surface. It is not clear whether the cutting action of the tips of the abrasive grains is due to their sharp edges or points or due to a tearing action occasioned by their engaging and pulling the bonded fibers to cause them to break in tension, or a combination of these factors, or others. It is within the broader scope of the invention to effect the spaced short cuts or nicks in any other suitable manner and with other apparatus, as by the use of toothed raking or cutting elements moving co-currently, counter-currently or transversely with respect to the bonded nap surface.

As will be seen in the photomicrographs below (and in those in the above mentioned copending patent applications Ser. Nos. 474,406 and 398,696) the nap fibers in at least the outermost zone (e.g. the outermost half) of the bonded nap lie largely parallel to the outer surface (and thus, of course, also parallel to the fabric structure). The fibers of the clumps formed by the more-or-less random cutting action of the abrasive grains are thus generally parallel to the outer surface when the clumps are brushed down but the bases of the clumps are sufficiently flexible that they can be easily brushed up and remain in their brushed-up positions.

Before the surface cutting treatment the opposite face of the fabric is preferably provided with a continuous layer of polymer material as described in Ser. No. 474,406. It is also within the broader scope of the invention to nap both faces of the fabric, gave both naps a bonding treatment, and subject one of the nap faces to the cutting treatment; the other nap face may then be given a similar cutting treatment if desired. With respect to the continuous layer of polymer material this may, as described in Ser. No. 474,406 be a cellular layer such as microporous polyurethane (illustrated below in Examples 4–5) or foamed polyvinyl chloride (Examples 1–3 below). The microporous polyurethane may be a breathable material as described in U.S. Pat. No. 3,637,415 which permits passage of water vapor and comprises cavities of generally rounded compact shape connected by smaller passageways. As indicated in Ser. No. 474,406 the vinyl coating may be formed, from a vinyl plastisol, in the manner described in the article on "Fabrics, Coated" in the Encyclopedia of Polymer Science and Technology, Interscience publishers Vol. 6 (1967) p. 472–489. At page 480 that article says that "By incorporating blowing or gassing compounds in the plastisol coating compositor *foamed coatings* may be obtained . . . Variations in the several techniques of production of vinyl focus are closely controlled to obtain interconnected (or open) or noninterconnected (or closed) air cells". At page 482 the same article says that the "plastisol coating compositions" are "dispersions of powdered polyvinyl chloride resin".

The following Examples are given to illustrate this invention further. In this application all proportions are by weight unless otherwise indicated.

EXAMPLE 1

Figure 1:
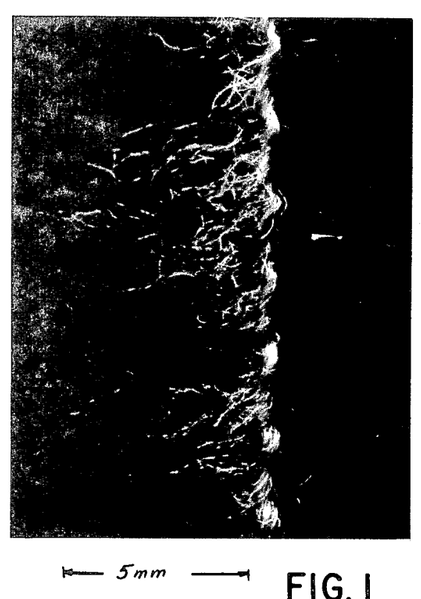
FIG. 1 is a photomicrograph of a filling yarn taken from a napped fabric used in this invention.
Figure 2:
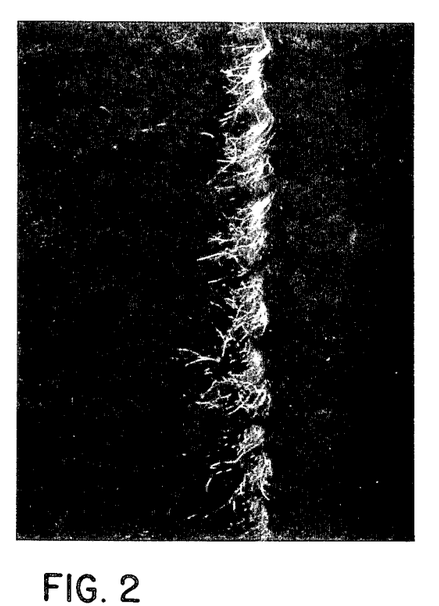
FIG. 2 is a photomicrograph of the same yarn after part of its napped has been cut off with a hand scissors (for the purpose of weighing the resulting cut fibers).
Figure 2:
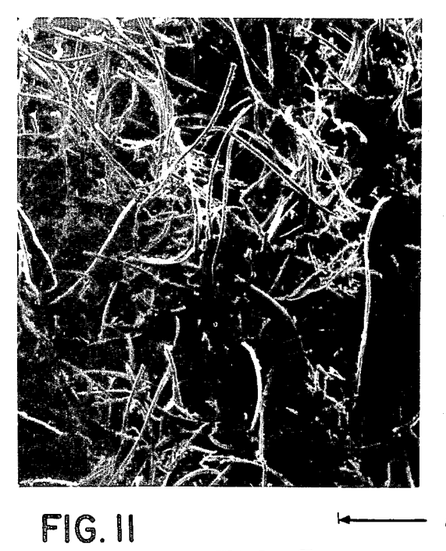

In this Example an unsheared napped 4/1 sateen is employed. The napped fabric weighs about 7 oz/sq. yd. (about 230 g/m$^2$) and has about 64 warp yarns per inch and about 58 filling yarns per inch, the weight of the napped filling yarns (per unit area of napped fabric)

being about twice that of the warp yarns (which are substantially free of any nap). FIG. 1 shows a napped filling yarn (which has been slid out from the edge of the fabric without significant effect on its nap); it will be seen that there are many projecting nap fibers longer than 3 mm. A rough idea of the weight of the longer fibers of the nap may be obtained by cutting off the nap fairly close to the main body of the yarn with a scissors; FIG. 2 shows the same yarn as in FIG. 1 after shearing it in that manner, a process which removes some 5% of its weight (equivalent to over 3% of the fabric weight). On testing a sample of the napped fabric it is found to have the following characteristics (for references, see the Wellington Sears Handbook of Industrial Textiles by Ernest R. Kaswell, pub. 1963 by Wellington Sears Company, Inc., N.Y., the appropriate pages of that book are given in parentheses below): gauge, thickness 0.029 inch (pages 571-2); contraction (of yarn), warp 2.06%, filling 8.88% (page 454); yarn no., warp 19.11/1, filling 9.49/1 ("indirect" pages 411-412, non-metric); twist (of yarn), warp 14.90"Z", filling 11.50"Z", grab strength, warp direction 120 pounds, filling direction 155 pounds (ASTM grab, Instron machine having jaws padded with rubberized duck, pages 470-471); elongation at break, warp direction 19.17%, filling direction 43.06% (pages 559-561); tongue tear strength, warp direction 21 pounds, filling direction 22 pounds (Scott J machine, pages 489-492). The napped fabric is made by napping a 4/1 sateen having a count of about 60×60.

Figure 3:
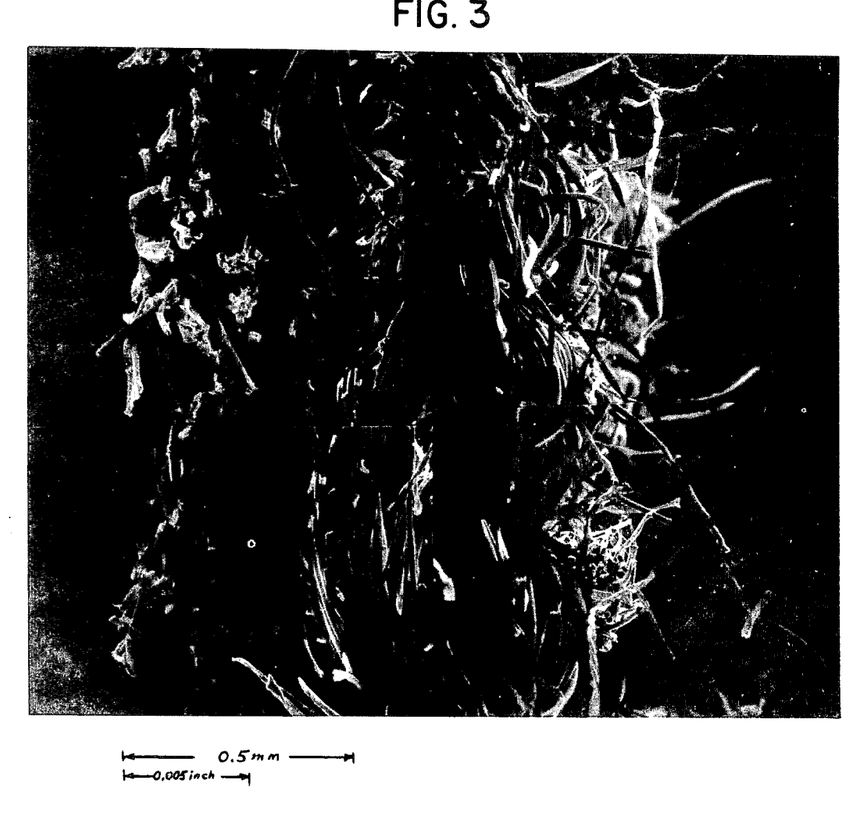
FIG. 3 is a photomicrograph, taken with a scanning electron microscope ("S.E.M."), of a cut edge of a nap-impregnated napped fabric.
Figure 4:
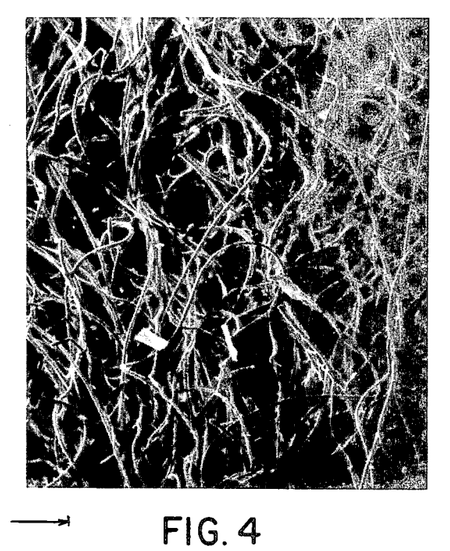
FIG. 4 is a S.E.M. photomicrograph looking down at the nap-impregnated face of that fabric.
Figure 5:
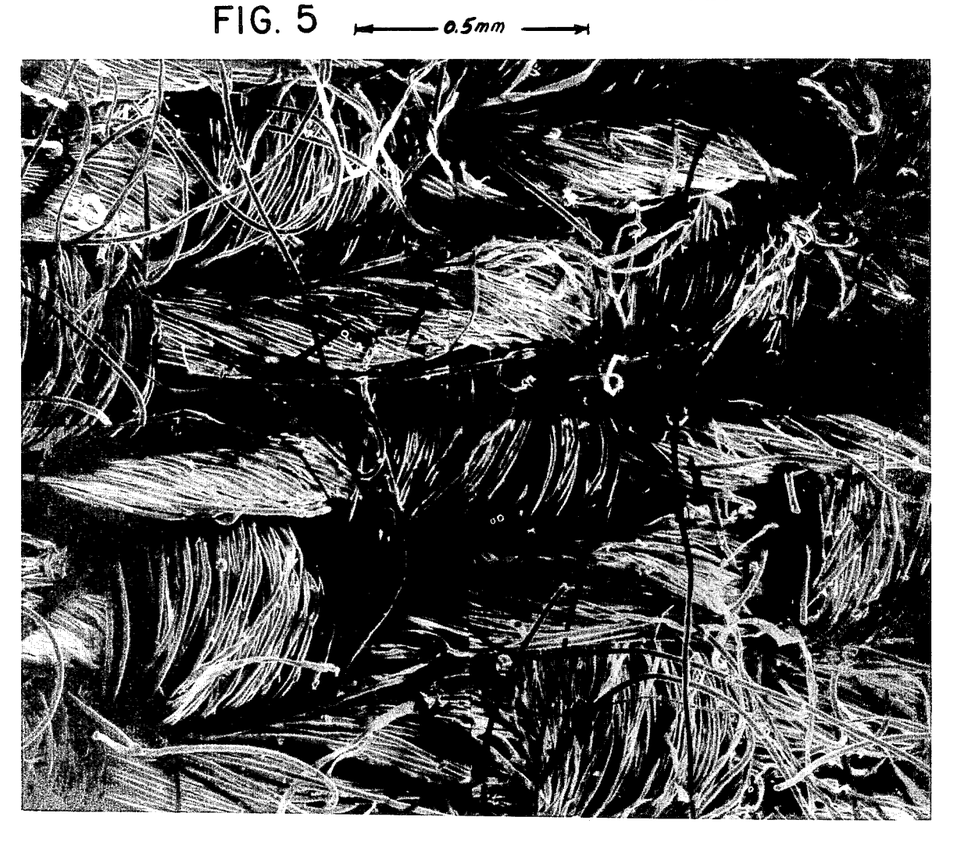
FIG. 5 is a S.E.M. photomicrograph of the unnapped face of that fabric.

The nap of the fabric is impregnated without substantially impregnating the main fabric structure, in the manner described in Example 19 of Ser. No. 474,406 by knife-coating it in two passes. In the first knife-coating pass the fabric travels under tension over rollers and under a coating knife (situated between said rollers) having upstream thereof a bank of the solvent-containing adhesive blend; the coating knife is inclined at an angle to the vertical, the direction of travel being such as to force down the nap (i.e. the free or outermost ends of nap fibers are upstream of the points at which those fibers originate from their parent yarns), to drive the impregnant through the nap to the upper surfaces of the yarns comprising the main woven fabric structure. After this first pass under the coating knife the solvent is evaporated by passing the coated fabric through an oven. The second pass is similar except that the blade is disposed in a vertical plane, perpendicular to the fabric, instead of inclined thereto, the conditions being such that the impregnant is not driven down through the nap but remains substantially within the nap. After the solvent has been evaporated in the oven the final curing of the impregnant occurs on standing; as explained in Ser. No. 474,406, this final curing effects cross-linking of the impregnant. The total weight gain of the fabric as a result of the impregnation is about 2½ oz./yd.$^2$ (about 85 g/m$^2$). The impregnation increases the measured thickness of the fabric from about 0.032 inch to about 0.045 inch. FIGS. 3, 4 and 5 are views of the impregnated fabric, taken with a scanning electron microscope; FIG. 3 shows the cross-section, FIG. 4 shows the impregnated nap face and FIG. 5 shows the unimpregnated face. It will be seen in FIG. 3 that the impregnation bonds nap fibers together so that when cut with a razor (to form the cut edge at which the photomicrograph was taken) they remain bonded and do not change position significantly, but the impregnation has little if any effect on the fibers within the yarns making up the main woven fabric structure; that is, these inner fibers tend to spread apart at the edge when so cut.

As can be seen from FIG. 1 the nap is not even, but includes fibers of various lengths side by side, and the resulting impregnated nap zone has localized variations in the amounts of impregnant and fiber; these variations are evident in FIGS. 3 and 4. Thus these Figs. show thin webs of impregnant which join and bridge neighboring fibers, but which do not form a continuous pore-free layer; substantially unblocked openings or passages greater than 0.05 mm across are visible in both the plan view (FIG. 4) and the cross-section (FIG. 3), the latter showing such openings situated between the main interlaced yarn structure and the webs of impregnant which are near the surface of the nap zone. As seen in FIG. 3 the thickness of the impregnated nap zone is in the neighborhood of about 0.5 mm, which is much less than the length of many of the nap fibers (see FIG. 1) and the nap fibers in at least the outermost portion (e.g. the outermost half) of the nap zone lie largely parallel to the surface (and thus of course also parallel to the fabric structure).

The unimpregnated face of the fabric is then vinyl coated in conventional manner, such as that described in Example 14 of Ser. No. 398,696, (which describes the use of a skin-forming polyvinyl chloride plastisol and a foamable polyvinyl chloride plastisol) giving a structure like that shown in FIGS. 18, 19 and 20 of that application.

The vinyl coating of the resulting structure may be embossed in a leather grain pattern, as by heating the coating (e.g. by infra-red radiation to a temperature of, say, 360°-380° F., preferably while the opposite face of the sheet remains cool, as at 120° F.) and passing it between cold pressure rolls; the cold roll which contacts the vinyl coating has a patterned surface and is chilled to effect a permanent shallow embossing of the exposed surface of the vinyl material. The appearance of the impregnated nap face of the resulting impregnated sheet material is substantially unchanged by the coating and embossing treatment.

Figure 6:
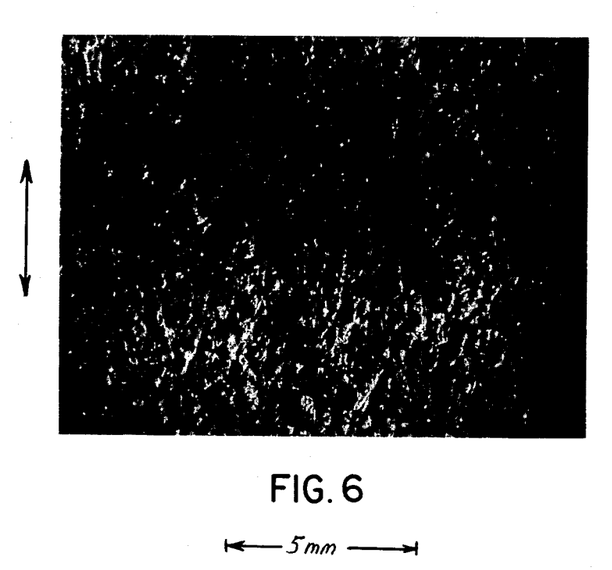
FIG. 6 is a photomicrograph, taken (like FIGS. 1 and 2) directly with a camera having a magnifying lens, of the nap-impregnated face of that fabric.

FIG. 6 is a view of the nap face of the coated embossed material taken with light directed almost perpendicular to the face. The arrow at the side of FIG. 6 is parallel to the "machine" direction, i.e. parallel to the warp yarns; this is the direction in which the fabric is moved, relative to the elements operating thereon, during the napping, impregnating and sanding operations.

The coated sheet material has a substantially uniform thickness, the gauge (as measured with a conventional Ames gauge) varying within a narrow range of less than about ±0.002 inch (e.g. within about ±0.01 inch) over most of the area of the sheet. While the individual filling yarns (and the twill structure) of the fabric are apparent to the naked eye even through the nap before the impregnation they are not discernible to the naked eye viewing the napped face after the impregnation; that is, the impregnated napped face has the appearance of a non-woven fabric.

The nap side of the sheet material is then lightly sanded and brushed on a conventional precision sanding machine (e.g. Curtin-Hebert oscillating machine, series 500, size 80 Ser. No. 070-748). The material is fed around the driven rubber coated revolving drum of the machine (with the vinyl side in contact with the drum) and is first lightly abraded by a driven sandpaper covered drum which is set at a controlled distance ("gap") from the rubber surface of the material-carrying drum.

While still on the rubber-covered drum the sheet material is then brushed by a driven rotating fiber brush which functions to remove any loose fuzz and deliver it to the outlet of a vacuum collector.

More particularly the arrangement is such that the sheet material is delivered from a supply roll thereof, through a braked tensioning device to the rubber-covered drum, travels approximately 180° around that drum, being engaged by the sandpaper after about 90° of such travel and being engaged by the brush at about the end of such travel, then travels past additional vacuum cleaning devices, through a nip of par of pull-rolls, at least one of which is driven, and is then wound up again. The braked tensioning device is set to provide a predetermined fixed tension on the material as it passes to the rubber-covered drum; this tension, and the pull exerted by the downstream pull-rolls insures that the material is pressed uniformly against the driven rubber-covered drum during its passage thereover.

The sandpaper is 80 grit ("3M Production Paper, E weight, closed coat aluminum oxide grit") and the aforesaid gap is preset at about 0.005 inch less than the thickness of the sheet material so that the penetration of the sandpaper into the nap is only about 0.005 inch (about 0.13 mm) and only the very outer portions of the impregnated nap are nicked by the outer portions of the largest grains of the sandpaper.

Figure 7:
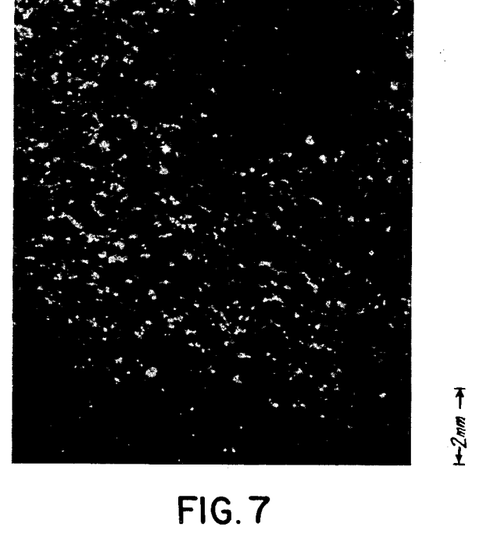
FIGS. 7 and 8 are photomicrographs (also taken directly with a camera having a magnifying lens, under two different lighting conditions) of the abrasive face of sandpaper used in the Examples below.
Figure 8:
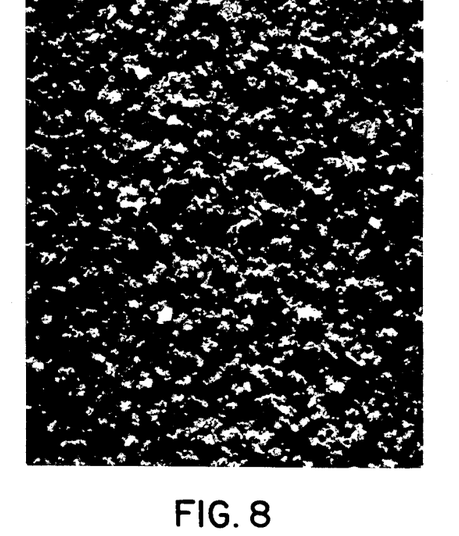

FIGS. 7 and 8 are top views of the sandpaper, showing the abrasive grains and the spacing thereof, FIG. 7 being taken with light directed almost perpendicular to the face and FIG. 8 with obliquely reflected light so that the shadows give some indication of the heights of the various grains; in each case the photographs are taken at a magnification of 8.2× (same scale as shown in FIGS. 1, 2 and 6). The largest grains, projecting furthest from the paper base of the sandpaper, appear to be spaced (on the average) on the order of about 1 mm apart (e.g. 0.5 to 1.5 mm apart). Visual inspection under the microscope, shows that these largest grains generally have sharp peaks projecting about 0.006 inch or more above their neighboring grains.

Unlike conventional sanding, in this Example the sandpaper is driven in the same direction as the direction of movement of the surface being sanded ("co-sanding" instead of conventional "counter-sanding"). The surface speed of rotation of the sandpaper is about 3,000 feet per minute and the surface speed of the rubber cover of the drum is about one yard per minute. The sandpaper drum rotates in a direction counter to the nap, i.e. its grains move in a direction from the impregnant-bonded nap fiber ends toward the yarn-anchored nap fiber ends. During its rotation the sanding drum also oscillates axially at a rate of about 2 oscillating cycles per second, the amplitude of oscillation being about ¼ inch so that the path of each sand grain is at a slight angle to the direction of rotation. The diameter of the sanding drum is about 13½ inches and the diameter of the sanding drum is about 9¼ inches; simple calculation will show that with the penetration of 0.005 inch the total travel (measured lengthwise of the sheet material) of the outermost point of a sanding grain within the nap is on the order of about 0.3 inch.

Figure 9:
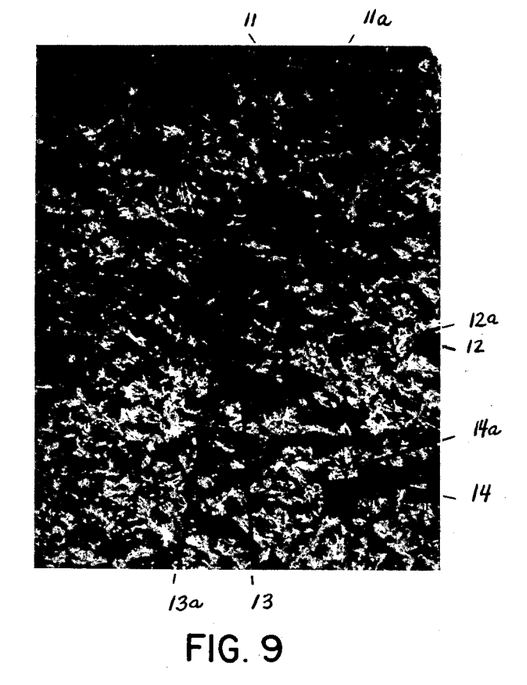
Figure 10:
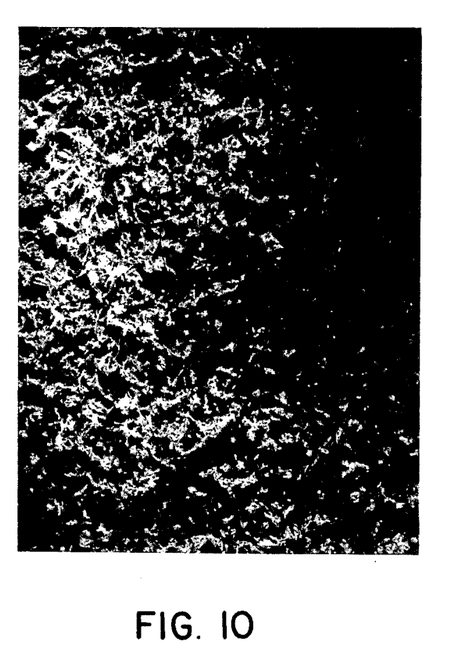

The product has a rough appearance somewhat resembling the "flesh side" of "fleshed" leather (e.g. a "split suede"). Its surface has spaced tiny clumps each made up of a number of nap fibers bonded together; these clumps have free ends projecting outward from the impregnated fibrous surface and have their bases flexibly anchored to the fabric. Many of the clumps can (by light brushing or movement of one's fingernail over the surface) be made to assume a stable more-less upright position or a more-or-less bent-over position. FIGS. 9 and 10 are views of identical areas of the sanded face taken with light directed almost perpendicular to the face light at a magnification of 8.2× (same scale as shown in FIG. 1), with the clumps brushed up (FIG. 9) and brushed down (FIG. 10). In FIG. 9 reference numerals 11, 12, 13 and 14 for instance, show "holes" or depressions from which clumps 11a and 12a, 13a, 14a, have been brushed to the "upright" position; in FIG. 10 such "holes" are not visible (or are largely obscured) since the corresponding clamps have been brushed down to the "bent-over" or "horizontal" position, level with the rest of the surface.

Figure 12:
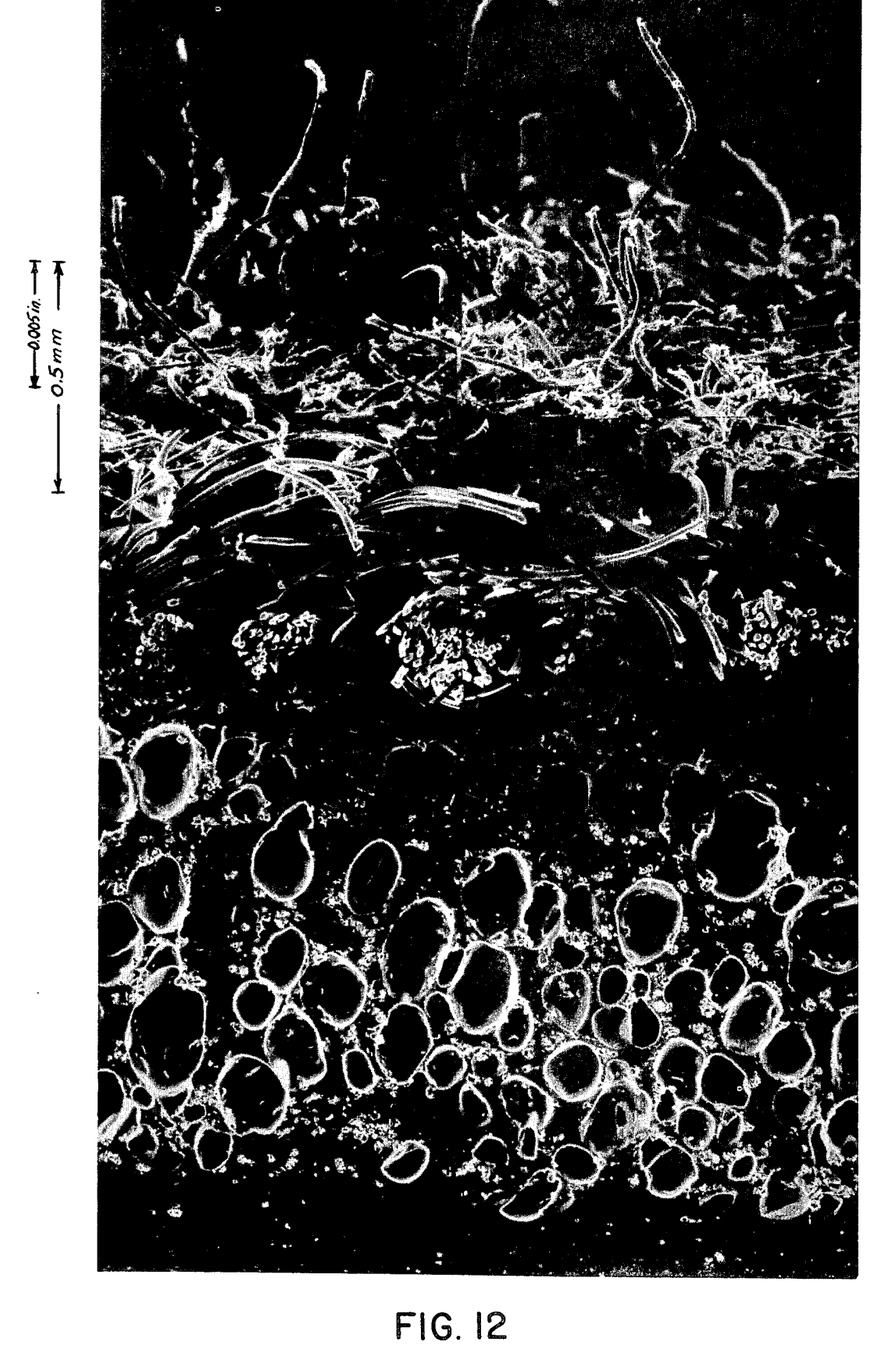
FIG. 12 is a S.E.M. photomicrograph of a cross-section (i.e. a cut edge) of the sanded product of Example 1.

It will be seen that while there are some long unclumped individual fiber ends in the sanded nap, the essential structure is that of clumps made up of a number of bonded fibers (usually well over five fibers such as 20 fibers, per clump) with fiber ends projecting from the clumps. (Note FIG. 11 which is a view of the face taken with a scanning electron microscope). The number of such clumps per unit area varies somewhat over the face of the fabric, e.g. it may be in the range of some 30 to 80 clumps of bonded fibers per square inch. The clumps are relatively thin; some are like flaps having broad bases (e.g. 1 to 2 mm wide) while some have relatively narrow bases (e.g. 0.1 to 0.2 mm wide) and look more like thick yarns. The flaps are of varying free lengths, some being as much as 3 or 4 mm long (from the "anchored end" of the flap to its free end) while others are as little as about ½ mm long or less; the lengths of the flaps are often considerably greater than the effective thickness of the impregnated pile, which as seen in FIG. 12 (a cross-section of the sanded product) is well over 0.3 mm, i.e., about 0.5 mm.

The thickness of the sheet material (measured with an Ames gauge) is only slightly, if at all, changed by the sanding and there is very little loss of weight in sanding. Thus, before sanding the thickness (measured with an Ames gauge) is about 0.0870 inch and the weight is about 48.05 oz./sq. yd.; after sanding, brushing (and accompanying vacuum removal of loose material) the corresponding values are 0.0855 inch and 47.7 oz./sq. yd.

Similar results are obtained at different sanding speeds, e.g. with sanding surface moving at about 600 feet per minute [#1 setting] while the sheet material moves in the same direction at about 10 yards per minute.

EXAMPLE 2

Instead of applying a vinyl coating (as in Example 1) to the unnapped face of the fabric, a skin-covered layer of microporous polyurethane is applied in the manner described in Example 26a of application Ser. No. 474,406. The resulting sheet material has a thickness of about 0.080 inch.

EXAMPLE 3

Example 1 is repeated, but using a stiffer vinyl layer which contains 100-150 parts of mineral filler (e.g. very fine calcium carbonate powder of average particle size about 1 micron or less, such as Duramite or Atomite) per 100 parts polyvinyl chloride. This layer may, or may not, be blown (expanded) to make it porous.

EXAMPLE 4

Example 1 is repeated but instead of applying vinyl coating to the unnapped face of the fabric, that face is adhered to a skin-covered thin layer (20 mils thick) of microporous material as described in Example 2 of the previously mentioned application Ser. No. 474,406. The release paper (on which the skin is formed) has a very smooth surface which imparts to the skin a glossy patent leather finish. Before laminating the fabric to the microporous material the unnapped face is lightly sanded to grind off high portions of yarns at that face (leaving fabric smoother and slightly fuzzy); this helps to avoid "show-through" on severe lasting.

EXAMPLE 5

Figure 13:
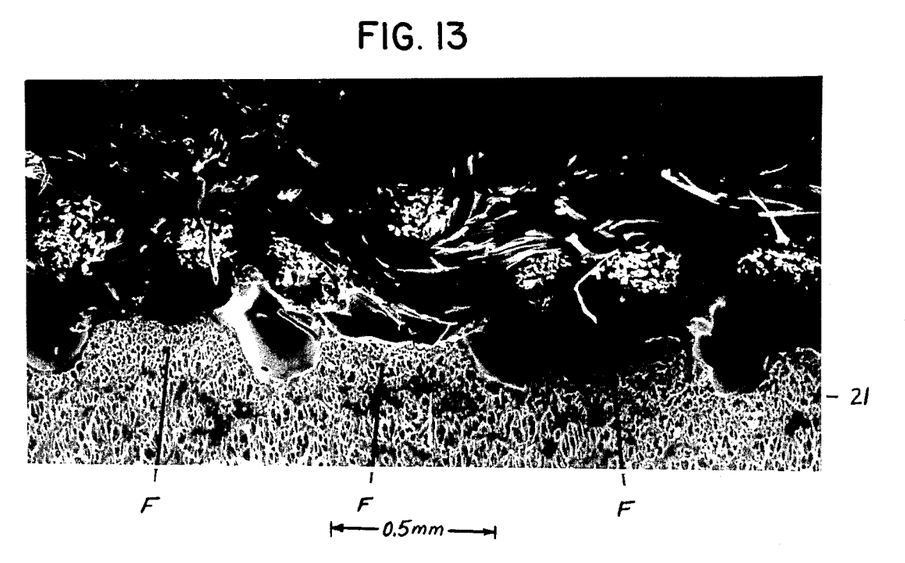
FIG. 13 is a S.E.M. photomicrograph of part of a cross-section (i.e. a cut edge) of a product described in Example 5a hereof.

(a) In this Example the impregnated fabric is laminated to a microporous sheet material which has a dense skin layer temporarily adhered to release paper, the assemblage being prepared in the manner described in Example 1 of said Ser. No. 474,406. The microporous sheet material has two integral microporous layers of different specific gravity; its upper layer, in contact with the skin, is about 15 mils thick and has a specific gravity of about 0.35. Its lower layer has a specific gravity of about 0.5; the bottom face of the lower layer 21 (FIG. 13) has tiny spaced projections or fingers F (formed during the manufacture of the material, as described in Warwicker et al U.S. Pat. No. 3,860,680 issued Jan. 14, 1975, whose entire disclosure is incorporated herein by reference; see particularly FIGS. 5 to 8 of that patent and the descriptions of those Figs. in the patent). An adhesive is applied to the bottom face of the lower layer and the assemblage is laminated to the smooth face of the impregnated fabric in the manner described in Example 1 or Example 7 of said Ser. No. 474,406. The product has spaces at the interface as seen in FIG. 13. The nap may be sanded to form the spaced flexible clumps as in Example 1 hereof. The use of a material having the spaced projections (or, conversely, spaced recesses), rather than one from which those projections have been removed (e.g. sanded off) appears to improve the moisture vapor transmission of the product.

(b) Example 5a is repeated except that the microporous sheet material is prewet with water, as described in Example 2 of said Ser. No. 474,406 before it is adhered to the skin layer. Also, the adhesive is applied to only the outer faces of the tiny projections or fingers (rather than also to the depressions between those projections) by using a reverse-roll applicator.

(c) Example 5b is repeated except that the microporous sheet (having the 15 mil thick upper layer of 0.35 specific gravity) has a total thickness of about 55 to 60 mils instead of about 75 to 80 mils, giving a final product whose thickness is about 100 mils rather than about 120 mils (about 3 mm).

(d) and (e). Examples 5b and c are repeated except that in each case the less dense upper layer occupies a larger proportion of the thickness of the microporous sheet, being about 35 mils thick.

As previously mentioned, best results have thus far been obtained by co-sanding rather than counter-sanding. The reasons for this are not understood. They may be related to the directions of the forces transmitted from the rubber surface of the driven sheet-transporting drum, through the porous polymer layer and the interlaced yarn structure, to the impregnated nap zone.

The characteristics, uses and advantages of the product are those described in said application Ser. No. 474,406, with the additional advantage of the attractive suede-like or flesh-leather appearance making it very suitable for unlined shoes, in which the nap face may be on the inside or even on the outside (as in boots in which the vamp and quarter portions of the upper have the nap face on the inside and the leg portion is made with the nap face on the outside). This appearance also makes it suitable for use in luggage, such as soft-sided luggage; here again the nap side may be on the inside or outside of the luggage, or alternately on one side and then the other (as in the boots described above).

In the foregoing Examples the woven fabric is a dyed fabric having a buff color and the impregnant in the nap is pigmented to have a similar buff color. The product has an appearance very much like that of natural suede or natural split suede leather. It is within the broader scope of the invention to use any desired color of fabrics; the impregnant is preferably colored in the same hue as the fabric.

While woven fabric is employed in the foregoing Examples it will be understood that knitted fabrics may be employed instead. The fabric characteristics are described in the previously mentioned application Ser. No. 474,406. In general it is preferred to use a napped material whose grab tensile strength (before impregnation, or after bonding of the nap) is well above 50 lbs. preferably above 80 lbs. and more preferably at least about 100 lbs. and whose tongue tear strength is at least about 10 lbs. in both directions. It is noted that in the napping operation the fabric shrinks and the resultant structure has a desirable high elongation and a stress-strain curve similar to that of the natural leather used for shoe uppers. In general the napped fabric before bonding weighs at least about 5 oz./yd.$^2$ (at least about 160 g/m$^2$).

It will be understood that the moving of the clumps to upright or bent-over positions can be effected with any suitable brush (e.g. a hair brush or suede brush), or even with the fingers, without any further severing of fibers or impregnant webs.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. An imitation leather material which comprises in combination:
   a. a woven fabric base sheet material, one surface of which is a napped surface and the other surface of which is not napped;
   b. the napped surface of the base sheet impregnated with a cross-linked polymeric material;
   c. the napped impregnated surface of the base sheet characterized by a buffed, flesh-like surface;
   d. an open-cell flexible polymeric cellular-layer bonded to the other unnapped surface of the base sheet material;
   e. a thin polymeric skin layer bonded to the surface of the cellular layer; and
   f. the thin polymeric skin layer characterized by an imitation leather-like surface, the fibers of said nap being bonded together by said impregnation, said bonded nap being severed, after bonding impregnation, along a multitude of short spaced lines to form spaced clumps of bonded fibers, said clumps having free ends and being brushable to and from stable upright positions, in which said free ends of the upright clumps project outwardly from the surrounding bonded nap and said fabric has a rough appearance, to bent-over positions in which said clumps merge with said surrounding bonded nap so that the fabric has a smoother appearance.

2. Product as in claim 1 in which
said cross-linked polymeric material is a cross-linked elastomeric polyurethane,
said open-cell layer is a microporous breathable elastomeric polyurethane comprising cavities of generally rounded compact shape connected by smaller passageways which layer permits the passage of water vapor,
and said skin is of film-forming flexible polymeric material.

3. Product as in claim 1 in which
said cross-linked polymeric material is a cross-linked elastomeric polyurethane,
said cellular layer is a layer of plasticized polyvinylchloride foam, and
said skin is of plasticized polyvinyl chloride.

4. An imitation leather material which comprises in combination:
a. a woven fabric base sheet material, one surface of which is a napped surface and the other surface of which is not napped;
b. the napped surface of the base sheet impregnated with a cross-linked polymeric material;
c. the napped impregnated surface of the base sheet characterized by a buffed, flesh-like surface;
d. an open-cell flexible polymeric cellular-layer bonded to the other unnapped surface of the base sheet material;
e. A thin polymeric skin layer bonded to the surface of the cellular layer; and
f. the thin polymeric skin layer characterized by an imitation leather-like surface.

5. The material of claim 4 wherein the cross-linked polymeric material comprises a cross-linked nitrile elastomer.

6. The material of claim 4 wherein the cellular layer is characterized by a density gradient with the higher density cellular material adjacent to the thin polymeric layer.

7. The material of claim 4 wherein the foam layer comprises two or more cellular layers of different density.

8. The material of claim 4 wherein the cellular layer comprises two or more cellular layers composed of different cellular materials and different densities, the higher density cellular material adjacent the thin polymeric skin layer.

9. The material of claim 4 wherein the polymeric skin layer is an elastomeric urethane resin.

10. The material of claim 4 wherein the laminate comprises an adhesive layer to bond the cellular layer to the unnapped surface of the fabric base sheet material.

11. The material of claim 4 wherein the leather-like surface is characterized by a grain-like surface composed of raised and low areas.

12. The material of claim 4 wherein the foam layer comprises a nitrile elastomeric cellular layer, a urethane cellular layer, an acrylic cellular layer, or vinyl chloride cellular layer.

13. The material of claim 4 wherein the skin polymeric layer is from about 0.1 to 3 mils in thickness, and the cellular layer is from about 3 to 30 mils in thickness.

14. The material of claim 4 wherein the cellular layer comprises two cellular layers of different densities and ranging from about 20 to 60 pounds per cubic foot.

15. The material of claim 4 wherein the impregnated polymeric material impregnates the base sheet for a portion of its thickness.

16. The material of claim 4 wherein the buffed ends of the napped fibers are exposed on the surface.

17. The material of claim 4 wherein the cellular layer comprises a flexible cellular layer having a breathable open-cell structure.

18. The material of claim 4 wherein the base sheet material is impregnated for a portion of its thickness with from 1 to 3 dry ounces/square yard of the cross-linked polymeric material.

19. The material of claim 4 wherein the polymeric thin-skin layer with the surface is an embossed surface and comprises a urethane elastomeric resin with raised areas on the skin layer.

20. An imitation leather sheet material which comprises in combination:
a. a woven fabric base sheet material, one surface of which is napped and sheared, and the other surface of which is not napped
b. the fabric of the napped surface of the base sheet material impregnated with at least a partially cross-linked nitrile elastomeric polymer material;
c. the impregnated napped surface characterized by a buffed, flesh-like leather appearance;
d. a substantially open-cell flexible polymeric cellular layer of from about 3 to 30 mils composed of at least two layers of different densities, the cellular layer composed of a nitrile elastomer, a urethane resin, an acrylic resin or a vinyl chloride resin, the layers bonded together;
e. an adhesive layer which bonds the lower density cellular layer to the unnapped surface of the base sheet material; p1 f. a thin urethane elastomeric resin skin layer of from about 0.1 to 3 mils bonded to the surface of the higher density cellular layer; and
g. the skin layer characterized by an embossed grain-like leather-like surface therein composed of raised and low areas.

21. An imitation leather material which comprises in combination:
a. a woven fabric base sheet material, one surface of which is a napped surface and the other surface of which is not napped;
b. the napped surface of the base sheet impregnated with a cross-linked polymeric material;
c. the napped impregnated surface of the base sheet characterized by a buffed, flesh-like surface;
d. a flexible polymeric cellular-layer bonded to the other unnapped surface of the base sheet material;
e. a thin polymeric skin layer bonded to the surface of the cellular layer; and
f. the thin polymeric skin layer characterized by an imitation leather-like surface,
the fibers of said nap being bonded together by said impregnation, said bonded nap being severed, after bonding impregnation, along a multitude of short spaced lines to form spaced clumps of bonded fibers, said clumps having free ends and being brushable to and from stable upright positions, in which said free ends of the upright clumps project outwardly from the surrounding bonded nap and said fabric has a rough appearance, to bent-over positions in which said clumps merge with said surrounding bonded nap so that the fabric has a smoother appearance.

22. Product as in claim 21 in which
said cross-linked polymeric material is a cross-linked elastomeric polyurethane,
said cellular layer is a microporous breathable elastomeric polyurethane comprising cavities of generally rounded compact shape connected by smaller passages which layer permits the passage of water vapor,
and said skin is of film-forming flexible polymeric material.

23. Product as in claim 21 in which
said cellular layer is a layer of plasticized polyvinylchloride foam, and
said skin is of plasticized polyvinyl chloride.

24. Product as in claim 23 in which
said cross-linked polymeric material is a cross-linked elastomeric polyurethane.

25. A method of preparing an imitation leather-like material which comprises:
a. impregnating the napped surface of a woven fabric base sheet material having a napped or an unnapped surface with a cross-linkable flexible polymer;
b. cross-linking the cross-linkable polymer to form at least a partially cross-linked polymer surface;
c. buffing the cross-linked impregnated surface to provide a flesh-like leather surface;
d. bonding a flexible open-cell cellular layer to the unnapped surface of the base sheet material; and
e. bonding a thin polymeric flexible skin layer to the cellular layer, the skin layer characterized by a leather-like surface appearance.

26. The method of claim 25 which includes coating the thin polymer skin layer onto a transfer sheet having an embossed design thereon and bonding the cellular layer to the thin skin layer on the transfer sheet, and after bonding the opposite surface of the cellular layer to the base sheet material removing the transfer sheet.

27. The method of claim 25 which includes applying an adhesive layer to bond the cellular layer to the base sheet material.

28. The method of claim 25 which includes applying a series of at least two cellular layers of different densities, with the surface of the cellular layer of greater density bonded to the skin layer and the surface of the lower density cellular layer bonded to the base sheet material.

29. The method of claim 25 wherein the polymeric skin layer is an elastomeric urethane resin.

30. The method of claim 25 wherein the cellular layer comprises a nitrile elastomeric cellular layer, a urethane cellular layer, an acrylic cellular layer or vinyl chloride cellular layer.

31. The method of claim 25 wherein the skin polymeric layer is from about 0.1 to 3 mils in thickness and the cellular layer is from about 3 to 30 mils in thickness.

32. The method of claim 25 wherein the cross-linked polymeric material comprises a cross-linked nitrile elastomer.

33. The method of claim 25 wherein the impregnation of the polymer does not extend into the main fabric structure of the base sheet material.

34. The method of claim 25 wherein the density of the cellular layer ranges from about 30 to 60 pounds per cubic foot.

35. The method of claim 25 which includes buffing the impregnated surface to expose the ends of the napped fibers on the flesh-like leather surface.

36. The method of claim 25 which includes:
coating an embossed transfer sheet with a urethane elastomeric resin coating to form a continuous layer which fills in the embossed design on the transfer sheet to provide an embossed skin layer.

37. The method of claim 25 which includes flexing the leather-like material to accentuate the grain of the embossed surface.

38. Method as in claim 25 in which
said cross-linkable polymer is a polyurethane which is an elastomer on cross-linking, and
said open-cell layer is a microporous breathable elastomeric polyurethane comprising cavities of generally rounded compact shape connected by smaller passages which layer permits the passage of water vapor,
and said skin is of film-forming flexible polymeric material.

39. Method as in claim 25 in which
said cross-linkable polymer is a polyurethane which is an elastomer on cross-linking, and
said cellular layer is a layer of plasticized polyvinylchloride foam, and
said skin is of plasticized polyvinyl chloride.

40. A method of preparing an imitation leather-like material which comprises:
a. impregnating the napped surface of a woven fabric base sheet material having a napped or an unnapped surface with a cross-linkable flexible polymer;
b. cross-linking the cross-linkable polymer to form at least a partially cross-linked polymer
c. buffing the cross-linked impregnated surface to provide a flesh-like leather surface,
d. bonding a flexible cellular layer to the unnapped surface of the base sheet material; and
e. bonding a thin polymeric flexible skin layer to the cellular layer, the skin layer characterized by a leather-like surface appearance,
said buffing comprising severing said impregnated napped surface, after said cross-linking, along a multitude of short spaced lines to form spaced clumps of bonded fibers, said clumps having free ends and being brushable to and from stable upright positions, in which said free ends of the upright clumps project outwardly from the surrounding bonded nap and said fabric has a rough appearance, to bent-over positions in which said clumps merge with said surrounding bonded nap so that the fabric has a smoother appearance.

41. Method as in claim 40
said cross-linkable polymer is a polyurethane which is an elastomer on cross-linking, and
said cellular layer is a microporous breathable elastomeric polyurethane comprising cavities of generally rounded compact shape connected by smaller passages which layer permits the passage of water vapor,
and said skin is of film-forming flexible polymeric material.

42. Method as in claim 40 in which
said cross-linkable polymer is a polyurethane which is an elastomer on cross-linking, and said cellular layer is a layer of plasticized polyvinylchloride foam, and said skin is of plasticized polyvinyl chloride.

43. A method of preparing an imitation leather-like material, which method comprises:

a. impregnating the napped and sheared surface of a woven fabric sheet material having a napped and an unnapped surface with a cross-linkable nitrile elastomeric polymer;

b. cross-linking the impregnated elastomeric polymer c. buffing the cross-linked polymer surface to provide a flesh-like leather surface;

d. coating a thin skin layer of from 0.1 to 3 mils of a flexible elastomeric urethane resin onto a transfer sheet having an embossed grain-like surface thereon;

e. coating a series of at least substantially open-cell layers onto the skin layer, the foam layers composed of an elastomeric cellular, an acrylic cellular or a urethane cellular material, the cellular layers having a thickness of from about 3 to 30 mils, the cellular layers having a difference in cellular densities;

f. coating a thin layer of an adhesive resin onto the exposed surface of the cellular layer;

g. placing the unnapped surface of the base sheet material onto the adhesive layer;

h. heating the laminate so formed to bond the coating layers together and to the base sheet material to form an integral, flexible, composite sheet material;

i. removing the transfer sheet; and j. recovering a flexible, leather-like laminate material with a grain-like embossed surface on the skin layer and a leather flesh-like surface on the opposite surface.

* * * * *